United States Patent
Dillon, Jr. et al.

[15] 3,637,289
[45] Jan. 25, 1972

[54] DEVICES BASED ON INDUCED DICHROISM

[72] Inventors: Joseph F. Dillon, Jr., Morris Township, Morris County; Ernst M. Gyorgy, Madison; Joseph P. Remeika, Somerset, all of N.J.

[73] Assignee: Bell Telephone Laboratories, Incorporated, Berkeley Heights, N.J.

[22] Filed: Mar. 7, 1969

[21] Appl. No.: 805,230

[52] U.S. Cl. .............. 350/151, 350/147, 350/150, 350/154, 350/160
[51] Int. Cl. .............................................. G02f 1/18
[58] Field of Search ........... 350/147, 149, 150, 151, 154, 350/160

[56] References Cited

UNITED STATES PATENTS

| | | |
|---|---|---|
| 3,492,492 | 1/1970 | Ballman et al. .................. 350/150 X |
| 3,503,667 | 3/1970 | Schmidt-Tiedeman ............ 350/150 X |
| 3,503,668 | 3/1970 | Domenico, Jr. et al. .......... 350/154 X |

OTHER PUBLICATIONS

Wood et al., "Effect of Impurities on the Optical Properties of Yttrium Iron Garnet" J. App. Phys. Vol. 38, No. 3 Mar. 1, 1967 pp. 1038–1045.

Primary Examiner—David Schonberg
Assistant Examiner—Paul R. Miller
Attorney—R. J. Guenther and Edwin B. Cave

[57] ABSTRACT

Dichroism for light as well as magnetic anisotropy may be optically induced in a crystalline material manifesting spontaneous magnetic polarization within which a magnet cation of a valence state other than the nominal value is permitted and within which such an ion may occupy either of at least two crystallographically equivalent but magnetically in equivalent sites. An example of such a material is silicon-doped YIG in which $Fe^{2+}$ may occupy any of four octahedral sites. Devices based on this phenomenon are described.

6 Claims, 2 Drawing Figures

PATENTED JAN 25 1972

3,637,289

INVENTORS J. F. DILLON, JR.
E. M. GYORGY
J. P. REMEIKA

BY
*George Schedy*
ATTORNEY 3,637,289

DEVICES BASED ON INDUCED DICHROISM

BACKGROUND OF THE INVENTION

1. Field of the Invention

The invention is concerned with elements for use with electromagnetic radiation of a bandwidth including visible light. These elements owe their utility to the fact that transmission properties may be altered and so they may serve as switches, modulators, memory elements, etc.

2. Description of the Prior Art

There are a variety of circuit elements for use at optical and near-optical frequencies which perform the various functions of modulation, switching, isolation, memory, etc. A variety of mechanisms is utilized.

Modulators and switches are often based on electro-optic or magneto-optic interactions. The first class is dependent on a change in refractive index for a given polarization sense of transmitted light, while the second is dependent upon the gyromagnetic effect, a species of which is known as Faraday rotation. Operation is dependent upon a small local change in electric or magnetic field, and this is usually accomplished by means of closely spaced conductive circuitry.

Isolators are generally dependent upon a nonreciprocity of the gyromagnetic rotation produced in a magneto-optic element. Memory functions are efficiently performed by various types of magnetic circuitry, some of which permit optical readout. Again, closely spaced conductive circuitry is generally required.

Very few devices have been proposed which depend upon the variation of a light transmission property in which the variation is itself produced by a light beam. Digital light systems and analog light systems have been described in which laser illumination of a photographic or other light-sensitive medium produces a transmission or reflective change which may later be interrogated or reconstructed by the use of light. Generally, the recorded information is permanent although the medium is occasionally recoverable by some massive treatment such as annealing.

Another class of light-light devices depend on operation near a Curie point of a Néel point or some other transition between two states, one of which exhibits spontaneous polarization. In this type of operation, the recording beam serves only to heat the medium above its transition, subsequent to which a saturating field aligns or reverses the polarization.

The concept of a simple light-light interaction device is attractive. A major problem in miniaturization—that of producing associated circuitry is avoided. In the ultimate, minimum dimensions of individual elements are those of available light beams.

Summary of the Invention

The invention is based on an anisotropy and/or associated dichroism which may be induced optically. The anisotropy is associated with a magnetic cation which has a valence state other than that of the nominal value indicated by the stoichiometry of the medium in which it is located. The mechanism is itself novel and may perhaps best be described in terms of the system requirements which give rise to it.

The medium is crystalline (desirably single crystal, at least in a thickness dimension, corresponding with a transmission direction for a light beam). The medium must manifest long range magnetic ordering. It may be ferromagnetic, ferrimagnetic or antiferromagnetic. Since, as will be discussed, the phenomenon is associated with local magnetization direction, usual magnetic parameters, such as saturation magnetization, remanent magnetization and coercivity are not of fundamental significance.

It is a further requirement that the medium include a magnetic cation which may occupy either of at least two crystallographically equivalent sites. "Crystallographically equivalent" denotes equivalence within the realm detectable by X-rays. As will be discussed, the invention depends on these sites being inequivalent magnetically and optically.

The magnetic cation must be capable of existing in a valence state for these sites which is different from that of the valence state of the same cation normally occupying these sites. This abnormal valence state is hereinafter referred to as the "extraordinary" valence state whereas the "ordinary" valence state is so denoted. It is necessary that the cation in the extraordinary state have a magnetic anisotropy which is different from that of the cation in its ordinary state. It makes no difference whether the anisotropy is larger or smaller. In this connection, there is no fundamental requirement that the ion be anisotropic in both of its two valence states so that the cation may be substantially isotropic in one of its two states.

One species of the invention depends upon a difference in absorption as between the cation in the ordinary and extraordinary valence state, and this absorption differential is a prerequisite of the dichroism. Accordingly, the absorption which is introduced or removed upon the change in valence must occur in a sufficiently transparent part of the transmission spectrum for the medium to be detectable.

Having stated the requirements, the phenomenon may be briefly described. The description is in terms of the preferred embodiment in accordance with which magnetic anisotropy and associated dichroism is introduced in response to an incident plane-polarized light beam. The dichroism so introduced may then be detected by means of an interrogating plane-polarized light beam, and this too represents a preferred embodiment. In an alternate species, the interrogating beam is replaced by a magnetic field.

It has been stated that the alternate sites are optically inequivalent. Accordingly, an incident plane-polarized beam interacts with (or illuminates) one or the other of this nominal number of sites unequally. If the beam is made up of or includes a wavelength for which an ion in the sites is absorbent, this ion is selectively energized. Where the extraordinary valence state corresponds with the presence of an extra electron, this selective absorption gives rise to electron hopping and a consequent depopulation for the illuminated sites with respect to the cation in its extraordinary state. It follows that the alternate sites of the equivalent set will have an increased population and will, therefore, show an absorption for the appropriate wavelength which is different from that of the preferentially illuminated sites (which is now populated to a larger extent by the cation in its ordinary populated state).

Since the different valence states of the magnetic cation also result in different magnetic anisotropies, the induced change in population results in an induced anisotropy. This induced anisotropy or "easy direction" if sufficiently large, determines the axis or the magnetization and thus both fixes the population imbalance thereby resulting in a "permanent" memory and also permits magnetic interrogation.

A variety of devices based on light-light interactions and/or field-light interactions are described. These devices which form embodiments of the invention may serve switching, modulation and/or memory functions.

DETAILED DESCRIPTION

1. Composition

Figure 1:
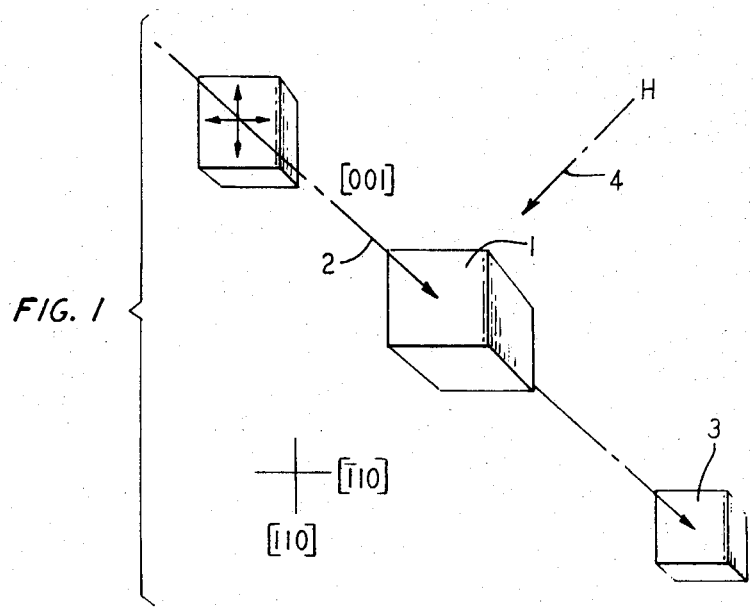
FIG. 1 is a schematic representation of a generalized element dependent upon the inventive concept.

The general requirements have been set forth. Suitable materials include garnet, spinel and perovskite structures. Exemplary magnetic materials (and, as above defined, these include materials in any category manifesting long range magnetic order) in each of these three structural categories include compositions which contain trivalent iron ions. Such materials also permit the presence of small amounts of divalent iron and all have equivalent sites (as defined) to accommodate this extraordinary valence state ion. Trivalent iron is substantially isotropic while divalent iron is markedly anisotropic. $Fe^{2+}$ also has a pronounced absorption in a wavelength region for which typical materials of this nature are transparent (12,000–20,000 A.). The inventive requirements are, therefore, met. Largely due to the large anisotropy difference between these two valence states in iron, materials of this category constitute a preferred embodiment of the invention.

There is a definitive body of work concerned with the regulation of $Fe^{2+}$ content in YIG (yttrium iron garnet—$Y_3Fe_5O_{12}$), see Vol. 38, No. 3, *Journal of Applied Physics*, p. 1,038–45 (Mar. 1, 1967). It has been observed that introduction of tetravalent ions such as $Si^{4+}$, $Ge^{4+}$ and $Sn^{4+}$ results in the reduction of trivalent iron to $Fe^{2+}$. In YIG, the octahedrally coordinated sites can accommodate the $Fe^{2+}$, and there are four equivalent sites as defined. Much of the work reported herein was carried out in YIG. Some of these experiments are discussed in detail further on.

A few suitable exemplary materials are set forth although it is realized that any person with a detailed knowledge of magnetic materials may easily expand on this list. In addition to YIG, gadolinium iron garnet as well as the rare earth iron garnets such as those of europium and lutecium are available and are appropriate for the practice of the invention. Compensated garnet compositions (ferrimagnets manifesting little or no external movement) including those which are compositionally compensated as well as those which are thermally compensated may be particularly advantageous. The preference of gallium partial substitution for tetrahedral sites in YIG is well known.

Substantially antiferromagnetic compositions such as are represented by gallium-compensated YIG are particularly suitable for the practice of the invention for the additional reason that such materials can stay magnetically saturated in zero applied field. While this is of little theoretical significance, elimination of domain walls removes one scattering influence for the transmitted beam.

The common spinel ferrites are based on the magnetite stoichiometry, $Fe^{2+}Fe^{3+}_2O_4$, in which the $Fe^{2+}$ are generally completely replaced by other divalent ions. Exemplary materials are nickel, magnesium, and manganese ferrites. In such materials the cation ratio, e.g., Ni/Fe, may be varied below the nominal ratio of one-half to produce $Fe^{2+}$.

The chalcogenides such as $CdCr_2Se_4$ and related materials with partial or total substitutions, notably for Cd or Se, are also of the spinel structure and are suitable for use in the inventive devices. In the particular composition set forth, $Cr^{3+}$ is the effective magnetic ion and, again, it may be reduced as, for example, by introduction of small amounts of gallium so as to result in $Cr^{2+}$.

Another class of magnetic compositions useful in the practice of the invention are those in the perovskite structure. Notable examples are the orthoferrites which are members of the $ABO_3$ stoichiometry. Illustrative materials include rare earth ions as the A cation and $Fe^{3+}$ as the B cation. Reduction to the $Fe^{2+}$ state may be achieved by inducing oxygen deficiencies or by the introduction of hydrogen interstitially. Illustrative nonoxidic perovskite structures are $RbFeF_3$ and $RbMnF_3$. Trivalent manganese-containing materials are illustrative of those in which the ion in its extraordinary valence state shows less anisotropy. There is no difference from a device from a device standpoint.

A detailed description of the growth techniques is not appropriately disclosed in this disclosure. Suitable materials may be grown by a variety of techniques and many are commercially available.

The only significant compositional limitations are those which relate to the detection limit for the induced dichroism or magnetization under operating conditions. This is somewhat dependent upon the change in anisotropy and upon the absorption change level resulting from the introduction of the magnetic cation in its extraordinary state. For the ions which have been discussed, $Fe^{3+}$–$Fe^{2+}$, $Mn^{3+}$–$Mn^{2+}$, $Cr^{3+}$–$Cr^{2+}$, a minimum content of approximately 0.01 ion percent of the extraordinary ion based on the total content of such ion regardless of valence result in easily detectable dichroism. There is no theoretical maximum other than a value which corresponds with sufficient retention of the ion in its ordinary valence state to permit detection of the induced population shift. Of course, strain induced by both the extraordinary valence state cation and the usually accompanying compensating ion give rise to growth difficulties and crystal flawing which imposes a lower maximum value. Whereas this depends on the particular system, growth technique, etc., systems investigated may tolerate up to about 50 atom percent of the extraordinary valence state cation without serious flawing; and this, therefore, constitutes a preferred maximum.

Other compositional compensations are common to magnetic materials intended for optical use. Inhomogeneities due to various impurities and other defects are, of course, undesirable for the usual reasons. It is contemplated that optical grade materials will be utilized.

2. Device Design

The most significant class of devices are those in which a first light beam is used to modify the transmission characteristics of the medium for a second light beam. Ordinarily, differentiation between the first and second beams is on the basis of amplitude. In certain systems, however, the differentiation may be on a different basis. For example, in materials in which a detectable level of population shift takes many seconds at a particular light level, the second beam may simply be of short duration. In any event, either beam must include at least a component which is preferentially absorbed by the cation in one valence valence state or the other. It is convenient to discuss this aspect of the invention in terms of the exemplary $Fe^{2+}$-containing YIG system.

A particular crystal was grown from a $PbO$–$B_2O_3$ flux which contained silicon. Optical measurement indicated a silicon content of 0.028 atoms per formula unit (so resulting in approximately 0.56 ion percent $Fe^{2+}$ based on the total number of iron ions).

YIG is treated as a cubic material below its magnetic transition with easy magnetization directions corresponding with the <111> body diagonals. The body diagonals are not orthogonal but lie at an angle at about 70.3° in the plane {110}. While devices may utilize crystalline sections of this material with a major surface corresponding with such a {110}, an alternative structure makes use of a section having a major face corresponding with a {100} plane. The projections of the <111> directions on the {100} planes are the orthogonal <110> directions.

In YIG, the $Fe^{2+}$ ions preferentially occupy the octahedral sites, four in number. The trigonal axis of the four types of octahedral sites are coincident with the <111> axes. In the absence of a magnetic annealing procedure, the $Fe^{2+}$ ions are equally distributed in the four sites. A population imbalance may be produced by illuminating with a plane-polarized beam containing 1.2-micron-wavelength light (corresponding with the $Fe^{2+}$ absorption) where the beam $b$ has an E vector whose effective value is greater for some <111> direction than for some other. The energy so introduced into the $Fe^{2+}$ ions occupying the octahedral sites, whose trigonal axis corresponds with some <111> direction, results in a disproportionate transfer of electrons to $Fe^{2+}$ ions in other octahedral sites. The result is twofold, the $Fe^{2+}$ absorption is decreased in such direction and a corresponding easy direction of magnetization results. Providing the temperature is maintained at a sufficiently low value such that the effect is not thermally masked, the dichroism induced, as well as the easy magnetization direction, is retained upon removal of the beam. This result has been obtained with the sample immersed in liquid helium maintained it its atmospheric boiling point (4.2° K.).

3. Detailed Description of the Figures

In FIG. 1, single crystal body 1 composed of YIG is cut with its major face corresponding with the (001) plane. Light beam 2, produced by means not shown, is plane-polarized, with its E vector in a direction corresponding with [110] or [$\bar{1}$10], is transmitted through body 1 and may be detected by amplitude detector 3. Beam 2 includes at least a component of radiation of such wavelength as to be preferentially absorbed by the cation in one or the other of its states. An applied saturating magnetic field H, shown as arrow 4, is optionally included. This field is within the (001) plane at a 45° angle to the [110] and [$\bar{1}$10] directions. Its presence assures occupation of the two designated sites corresponding with the <110> axes indicated. In operation, the dichroism introduced by illumination with beam 2 may be sensed by means of an interrogating beam which may also be represented as arrow 2 which may, itself, be plane-polarized, for example, with its E vector corresponding with either of the indicated <110> directions. The amplitude of the beam may be measured directly by detector 3, or beam 2 may be unpolarized with the detector 3 consisting of a polarizing analyzer.

Figure 2:
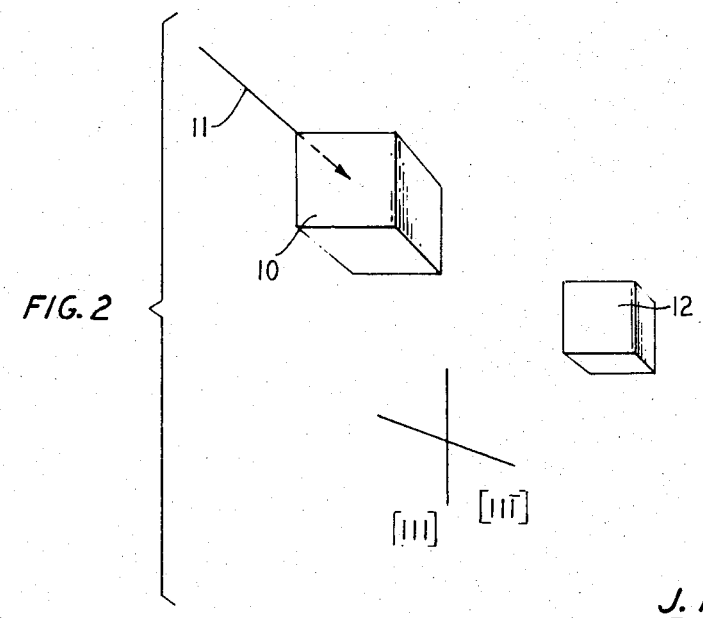
FIG. 2 is a schematic representation of another such element.

In FIG. 2, two <111> directions, i.e., [1$\bar{1}$1] and [1$\bar{1}\bar{1}$], are in the plane of the major surface 10 of crystal 12. This surface is therefore designated (110). Incident beam 11 normal to the major face is polarized parallel to [1$\bar{1}$1] making the [1$\bar{1}\bar{1}$] direction magnetically easy (in the case of YIG). The advantage of this arrangement is the substantial elimination of demagnetizing influences.

What is claimed is:

1. Element whose transmission property for a transmitted beam of electromagnetic radiation may be altered comprising:
    a crystalline body of a material which manifests spontaneous magnetization polarization,
    in which material there may exist a magnetic cation in a valence state hereinafter designated extraordinary which differs from that indicated by the stoichiometry of the medium hereinafter designated ordinary,
    in which the magnetic anisotropy of the said cation is different in its two valence states and in which occupation by such cation in its extraordinary state is permitted in at least two X-ray equivalent crystallographic sites, and
    in which the absorption of said medium for electromagnetic energy of some wavelength is changed by the presence of said cation in its extraordinary state characterized in that a dichroism for electromagnetic energy is introduced by illuminating said medium with a plane-polarized beam of electromagnetic energy, said beam including said wavelength, the polarization being such that at least two of the said sites are illuminated unequally,
    together with first means for illuminating said medium with a plane-polarized beam of electromagnetic energy so as to introduce the said dichroism and second means for detecting the said dichroism.

2. Device of claim 1 in which the said cation in its extraordinary valence state is selected from the group consisting of $Fe^{2+}$, $Mn^{2+}$, $Cr^{2+}$.

3. Device of claim 2 in which the crystallographic structure of the medium is selected from the group consisting of garnet, spinel, and perovskite.

4. Device of claim 3 in which the said medium is $Y_3Fe_5O_{12}$.

5. Device of claim 4 in which the said medium contains a tetravalent ion selected from the group consisting of $Si^{4+}$, $Ge^{4+}$ and $Sn^{4+}$.

6. Device of claim 1 in which the said second means comprises a radiation detector sensitive to changes in amplitude of such radiation.

* * * * *